United States Patent [19]
Jurges

[11] 3,860,142
[45] Jan. 14, 1975

[54] SELF-SEALING PRESSURIZED CONTAINER LOADING HATCH

[75] Inventor: Charles D. Jurges, Bellingham, Wash.

[73] Assignee: Intalco Aluminum Corporation, Ferndale, Wash.

[22] Filed: Sept. 29, 1972

[21] Appl. No.: 293,630

[52] U.S. Cl. .................. 220/344, 220/244, 277/187
[51] Int. Cl. ...................... B65d 85/00, A47j 36/06
[58] Field of Search ...... 220/46 P, 55 PC, 57, 46 R, 220/55 P; 277/187; 215/DIG. 1

[56] References Cited
UNITED STATES PATENTS

| | | | |
|---|---|---|---|
| 1,739,911 | 12/1929 | McMurray | 220/57 |
| 2,159,178 | 5/1939 | Rike et al. | 220/57 |
| 2,324,356 | 7/1943 | Brown | 220/57 |
| 2,540,583 | 2/1951 | Ives | 220/55 PC |
| 2,785,824 | 3/1957 | Reeves | 220/46 P |
| 3,064,853 | 11/1962 | Lents et al. | 277/187 |
| 3,091,358 | 5/1963 | Simpkins | 220/46 P |

Primary Examiner—William I. Price
Assistant Examiner—Allan N. Shoap
Attorney, Agent, or Firm—Kasper T. Serijan; Eugene J. Kalil

[57] ABSTRACT

A self-sealing pressurized container loading hatch is provided comprising a pivotally mounted hatch cover which in the closed or home position embraces an upstanding coaming or collar of the container in spaced relationship therewith. The cover has a flange which depends downwardly from the roof thereof which surrounds the collar and provides an annular space therebetween. A fixed annular elastomeric seal extends radially inwardly from the flange and sealingly contacts an annular ledge on the outside face of the collar to provide an airtight seal by virtue of air pressure within the container which exerts fluid pressure against the seal and maintains it in sealing relationship with the annular ledge on said collar.

2 Claims, 5 Drawing Figures

SELF-SEALING PRESSURIZED CONTAINER LOADING HATCH

This invention relates to loading hatches and, in particular, to a self-sealing loading hatch for use with pressurized containers, such as commonly used in cement trailers and other bulk containers employed for shipping particulate material and which use low pressure air conveying as the unloading method.

STATE OF THE ART

It is known to ship powdered alumina in pressurized containers via trailers in which sealed loading hatches are employed to assure an airtight seal. On standard trailers, it is customary to employ adjustable clamps for locking the hatch cover. However, it was found that the clamps were very difficult to keep in operation due to seizing from alumina dust. In addition, it was common to have air leakage due to small dents in the trailer coaming or collar or due to wear in the rubber gasket which formed the seal between the hatch cover and the collar in the hatch assembly. Air leakage is disadvantageous in that it has an adverse effect on the alumina unloading rate.

It would be desirable to provide the loading hatch with a sealing system that utilizes the air pressure within the container to maintain the seal and which does not rely on the closeness of fit of the hatch cover on the collar.

OBJECTS OF THE INVENTION

It is thus the object of the invention to provide a self-sealing loading hatch.

Another object is to provide a self-sealing hatch assembly in which the cover thereof is capable of being held down using a simple pivot hinge and one latch and which need not use clamps for locking said cover.

A further object of the invention is to provide a self-sealing loading hatch for pressurized containers or trailers in which the internal air pressure of the container is employed in maintaining a tight seal.

These and other objects will more clearly appear when taken in conjunction with the following disclosure and the accompanying drawing, wherein.

STATEMENT OF THE INVENTION

Broadly stated, the invention is preferably directed to a self-sealing loading hatch for pressurized containers comprising an upstanding coaming or collar integral with and surrounding an opening in the container through which material, such as bulk alumina, is charged in the container, the collar having a seal-engaging annular ledge securely fixed to the outside face therof, the hatch having a cover for said collar hingedly connected to the container and pivotally swingable from an open position to a closed or home position to embrace said collar. The cover has an inner roof and a continuous flange depending downwardly therefrom which surrounds the collar in annular spaced relationship therewith when the cover is in home or closed position, the inner roof of the cover being out of contact with the top rim of said upstanding collar. The peripheral inner wall of said downwardly depending flange has an annular elastomeric flapper seal mounted therearound with its free end extending radially inwardly towards the seal-engaging ledge of said collar when the cover is in home position, such that when the seal is in wiping contact with the seal-engaging ledge of the collar, it is held against said ledge by virtue of the air pressure within the container. The hatch is provided with latch means pivotally mounted on said container for holding the cover in home position out of contact with the upper rim of said collar.

The advantages which accrue from the foregoing novel assembly are: (1) the air seal is achieved with a self-sealing elastomeric gasket, e.g. rubber, neoprene, and the like, that relies on the pressure within the container to maintain the seal and does not require a close fit between the cover and the collar; (2) the hatch need not employ adjusting clamps that rust or seize with powdered alumina; (3) the top portion or upper rim of the collar cooperating with the cover is not used for the air seal and, therefore, any damage to the top rim of the collar during loading will have substantially no adverse effect on air leakage; (4) the latch is designed to prevent opening of the hatch while under air pressure so that when the container is pressurized to about 15 lbs. per square inch, the latch handle cannot be lifted without assistance; and (5) the manner in which the elastomeric gasket is used (sealing by wiping contact) is intended to provide long service life as opposed to other types of high pressure seals which are subject to much abrasion and wear.

DETAIL ASPECTS OF THE INVENTION

Figure 1:
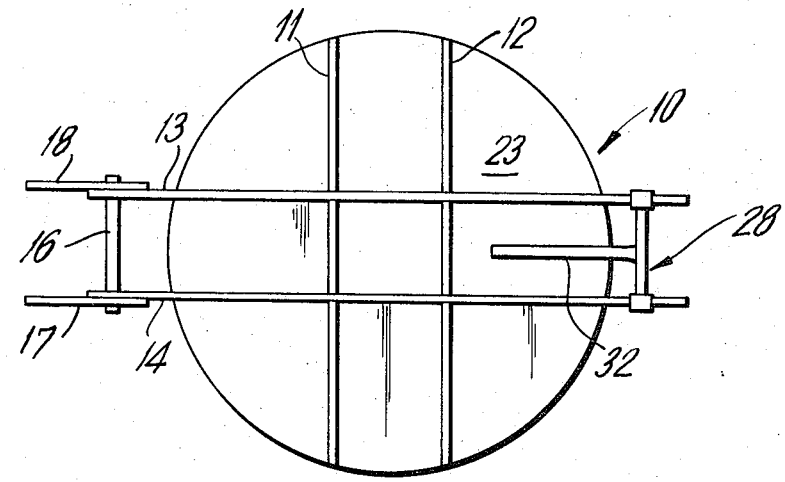
FIGS. 1 and 2 are simple line drawings of a self-sealing loading hatch shown in plan and front view elevation (cross section), respectively.

The more detailed aspects of the invention will clearly appear by reference to the drawings. Referring to the simple line drawing of FIGS. 1 and 2, a hatch cover 10 is reinforced as shown by two pairs of cross ribs 11, 12 and 13, 14 at right angles to each other, the cover being swingably mounted via pivot hinge 15 by means of pintle 16 which passes through a pair of side brackets 17, 18 fixed to container 19. The container is provided with an integral coaming or upstanding collar 20 which surrounds opening 21, the collar's upper rim 22 extending to below and out of contact with inner roof 23 of the cover, said roof having a flange 24 which depends downwardly therefrom and embraces collar 20.

The outer face of collar 20 is provided with a seal-engageable annular ledge 25 which is oppositely disposed to an annular seal-mounting ledge designated by the numeral 26 to which is anchored via fastening means an annular elastomeric flapper seal or gasket 27 with its free end extending inwardly towards and in wiping engagement with ledge 25 when the cover of the hatch is in closed or home position. As will be noted, the inner roof of the cover in home position does not touch upper rim 22 of the collar, but rather is spaced from it.

Figure 5:
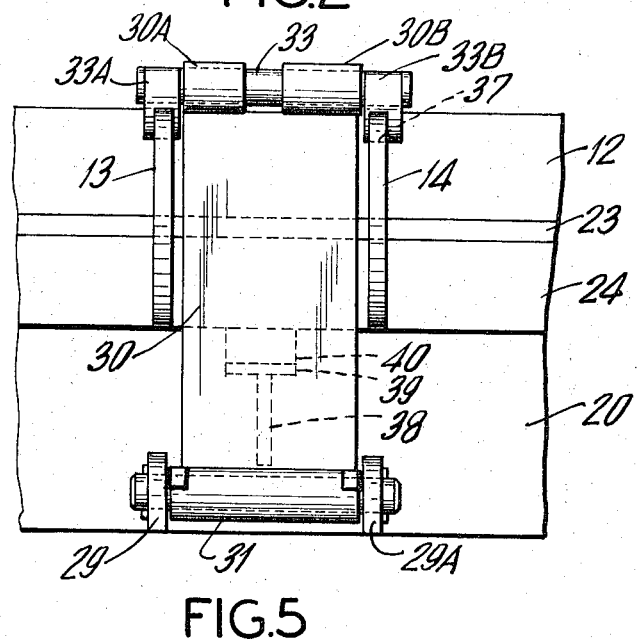
FIG. 5 is an end view of the cover latch as viewed along line 5—5 of FIG. 3.
Figure 3:
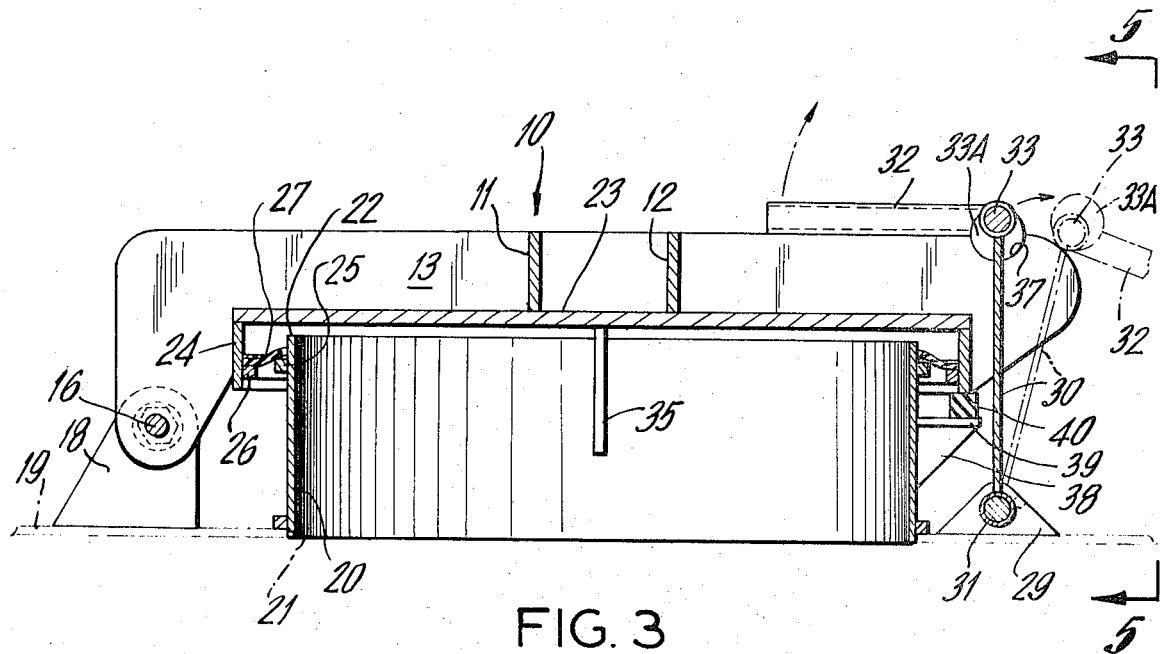
FIG. 3 is a sectional view in elevation of a more detailed rendition of the self-sealing loading hatch of the invention as viewed along line 3—3 of FIG. 4.
Figure 4:
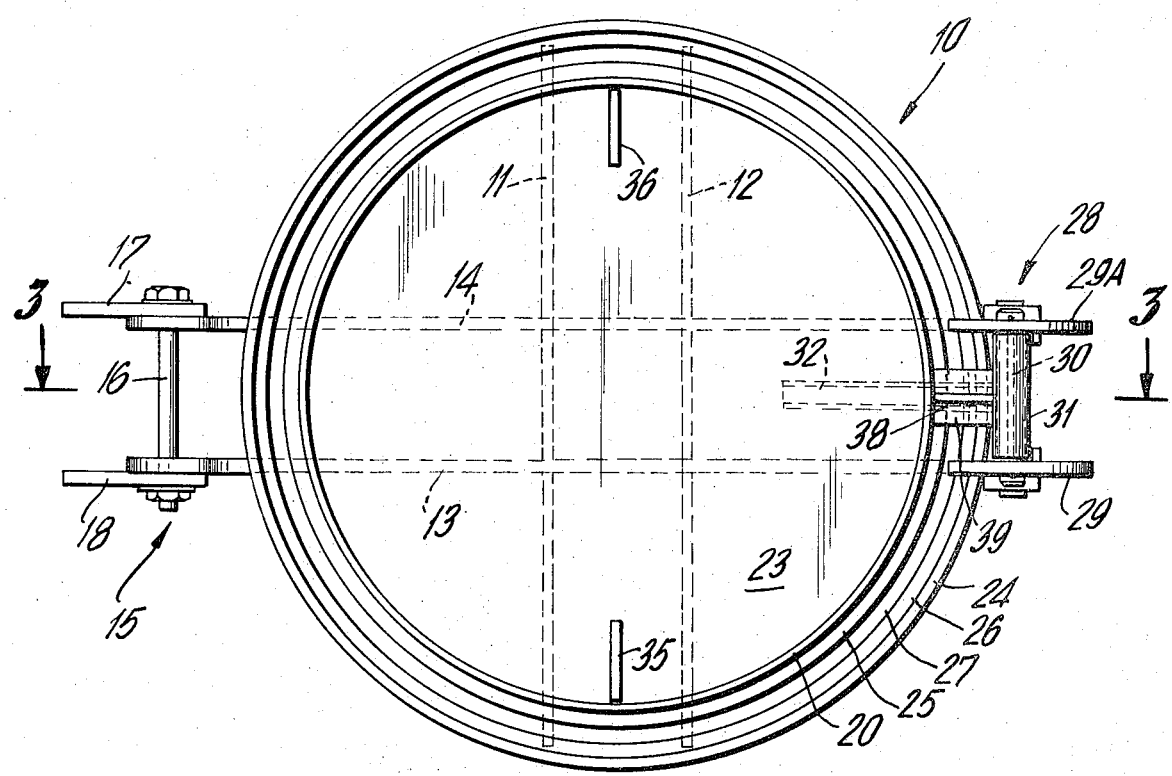
FIG. 4 is a bottom view of the loading hatch of FIG. 3.

Diametrically opposite pivot hinge 15, a safety latch 28 is provided comprising brackets 29, 29a (hidden from view) fixed to the container to which is pivotally mounted a swing element or link 30 at 31, the other end of the element being coupled to handle 32 at 33 via a pair of sleeves (note FIGS. 3–5). The latch works on a camming principle shown in FIGS. 3–5.

Figure 2:
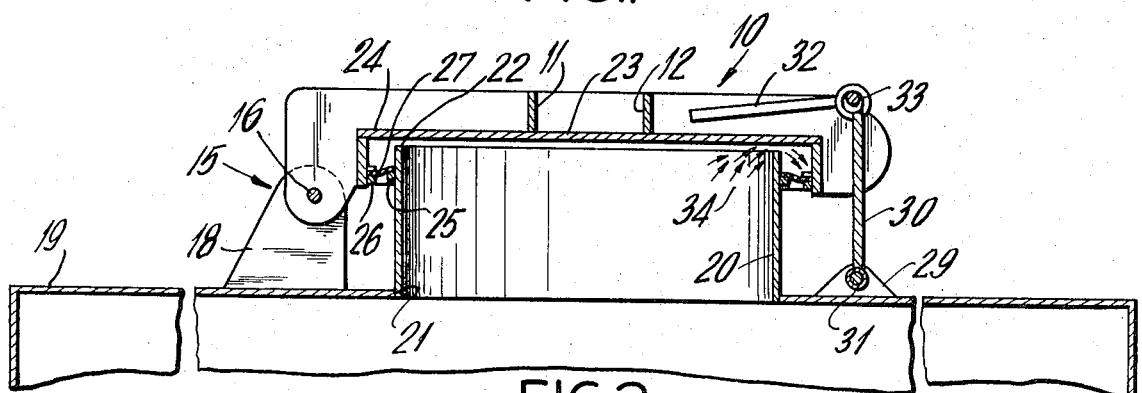

As will be observed from FIG. 2, when the cover is in home position, air pressure 34 designated by the arrows within the container maintains a tight seal by virtue of fluid pressure exerted on the free end of the flapper seal.

The self-sealing loading hatch is shown in greater detail in FIGS. 3–5, the same numerals being used to designate the same parts. The inner roof 23 of the cover has depending downwardly from it two centering plates 35, 36, diametrically oppositely disposed to each other and being positioned to enter within and close to the inner periphery of the collar when the cover is closed.

The safety latch is swing mounted via element or link 30 pivotally connected to brackets 29, 29A and is provided with a pair of cams 33A, 33B (note FIG. 5) which are fixed to a shaft 33 which shaft angularly rotates by manipulating handle 32, element 30 being coupled to the shaft via sleeves 30A, 30B. Rotation of the shaft via handle 32 which is fixed to it causes the cams to move in or out of cooperation with the top of the cover, that is, with respect to ribs 13, 14 which extend beyond roof 23 of the cover and downwardly along flange 24. Thus, when handle 32 is raised, cams 33A, 33B (note dotted lines in FIG. 3) are lifted out of contact with the top of ribs 13, 14 of the cover, the ribs being recessed at 37 to receive the cam. The latch does not lock the cover tightly in place but merely holds it in position to enable the free end of the flapper seal to contact annular ledge 25 on the outside face of collar 20.

A stop is preferably provided for the cover in the closed position so as to insure that the roof of the cover does not contact the upper rim of the collar. This stop comprises a triangular bracket 38 fixed to the outside face of the collar, the bracket having a platform 39 on which is supported a stop 40 of, for example, hard rubber against which the rim of downwardly projecting flange 24 bears when the cover is in home position. The stop thus assures clearance between the upper rim 22 of the collar and the roof 23 of the cover. However, means in place of the stop can be employed to provide the same results.

The foregoing assembly of elements will enable a tight air seal even when the hatch cover is within about one-quarter inch of the proper location. Thus, some wear on the latch or hinge will not affect the seal. The single non-adjustable handle or clamp serves only to hold the hatch cover in relative position and is not required to exert pressure for the air seal.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a pressurized container adapted for carrying bulk particulate material, such as finely divided alumina, a self-sealing loading hatch comprising, an upstanding collar integral with and surrounding an opening in said container through which material is charged into said container, a seal-engageable annular ledge securely fixed to the outside face of said collar, a hatch cover for said collar hingedly connected to said container and pivotally swingable to embrace said collar in closing relationship therewith, said cover having an inner roof and a flange depending downwardly therefrom which surrounds the collar in spaced relationship therewith when the cover is in closed position, the inner roof of the cover being above and out of contact with the top rim of said upstanding collar, an annular elastomeric flapper seal with its outer periphery anchored by fastening means to the inner wall of said downwardly depending flange and with its free end extending radially inwardly towards and over said-engageable ledge of said collar when the cover is in closed position, such that when the cover is closed and said seal of said cover is in wiping contact with the seal-engageable ledge of said collar, it is held under pressure against said ledge by virtue of the air pressure within said container, and safety latch means pivotally mounted on said container for maintaining said cover in closed position and out of contact with the upper rim of said collar, stop means being provided against which the cover bears in closed position to assure that the inner roof of the cover is maintained out of contact with the top rim of said collar, said stop means being fixed to the collar in a position beneath said annular ledge.

2. The self-sealing loading hatch of claim 1, wherein the latch is provided with camming means which cooperates with a camming surface on the cover for maintaining said cover in closed position.

* * * * *